(12) United States Patent
Martin et al.

(10) Patent No.: US 11,231,099 B2
(45) Date of Patent: Jan. 25, 2022

(54) AXLE ASSEMBLY AND DIFFERENTIAL ASSEMBLY WITH SPIDER SHAFT RETENTION

(71) Applicant: ArvinMeritor Technology, LLC, Troy, MI (US)

(72) Inventors: Robert J. Martin, Newark, OH (US); Brian D. Hayes, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 816 days.

(21) Appl. No.: 15/347,277

(22) Filed: Nov. 9, 2016

(65) Prior Publication Data
US 2018/0128362 A1    May 10, 2018

(51) Int. Cl.
*F16H 48/40* (2012.01)
*F16H 48/08* (2006.01)
*F16H 48/38* (2012.01)

(52) U.S. Cl.
CPC ............ *F16H 48/40* (2013.01); *F16H 48/08* (2013.01); *F16H 2048/085* (2013.01); *F16H 2048/385* (2013.01)

(58) Field of Classification Search
None
See application file for complete search history.

(56) References Cited

U.S. PATENT DOCUMENTS

| | | | | |
|---|---|---|---|---|
| 2,971,404 A * | 2/1961 | Thornton | ................ | F16H 48/08 475/234 |
| 3,049,942 A * | 8/1962 | Kohler | ................... | F16H 48/08 475/236 |
| 3,089,349 A * | 5/1963 | Thornton | ................ | F16H 48/08 475/89 |
| 3,533,488 A * | 10/1970 | Jeakle | .................... | F16H 48/08 184/11.1 |
| 4,125,026 A * | 11/1978 | Torii | ...................... | F16H 48/08 29/893.1 |
| 4,577,530 A * | 3/1986 | Hickey | ................... | F16H 48/08 411/356 |
| 5,273,498 A * | 12/1993 | Dhillon | .................. | F16H 48/08 475/230 |
| 5,890,989 A * | 4/1999 | Yamazaki | .............. | B60K 23/08 180/247 |
| 6,045,479 A | 4/2000 | Victoria et al. | | |

(Continued)

FOREIGN PATENT DOCUMENTS

DE    102011077562 A1    12/2012

OTHER PUBLICATIONS

United States Patent and Trademark Office, U.S. Appl. No. 14/719,977, filed May 22, 2015.

(Continued)

*Primary Examiner* — Charles A Fox
(74) *Attorney, Agent, or Firm* — Brooks Kushman PC

(57) ABSTRACT

A differential assembly that may be provided with an axle assembly. The differential assembly may have a case that may have a first case portion and a second case portion. The first case portion may have a retainer pin hole that may receive a retainer pin that couples a spider shaft to the first case portion. The second case portion may inhibit removal of the retainer pin from the retainer pin hole.

20 Claims, 7 Drawing Sheets

(56) References Cited

U.S. PATENT DOCUMENTS

| | | | |
|---|---|---|---|
| 7,195,577 B2* | 3/2007 | Shirato | F16H 57/029 |
| | | | 475/230 |
| 7,291,083 B2 | 11/2007 | Almaguer | |
| 7,695,392 B2 | 4/2010 | Isken, II et al. | |
| 8,535,191 B1 | 9/2013 | Gall et al. | |
| 8,651,994 B2 | 2/2014 | Bassi et al. | |
| 9,109,635 B2 | 8/2015 | Boothby et al. | |
| 9,410,605 B2 | 8/2016 | Kluck | |
| 9,651,132 B2* | 5/2017 | Mummigatti | F16H 48/40 |
| 2002/0155913 A1* | 10/2002 | Fusegi | B60K 23/04 |
| | | | 475/150 |
| 2007/0225106 A1* | 9/2007 | Veldman | B60K 17/16 |
| | | | 475/231 |
| 2007/0249458 A1* | 10/2007 | Veldman | F16H 48/08 |
| | | | 475/230 |
| 2012/0149522 A1 | 6/2012 | Isken, II et al. | |
| 2015/0059180 A1 | 3/2015 | Hirao | |
| 2015/0141194 A1* | 5/2015 | Radzevich | B60K 17/165 |
| | | | 475/230 |
| 2015/0184735 A1* | 7/2015 | Yanase | B23K 31/02 |
| | | | 475/230 |
| 2015/0337936 A1 | 11/2015 | Chandrashekar et al. | |
| 2017/0089440 A1* | 3/2017 | Shirakawa | B23K 15/0006 |
| 2017/0204956 A1* | 7/2017 | Martin | F16H 48/08 |

OTHER PUBLICATIONS

United States Patent and Trademark Office, U.S. Appl. No. 14/996,663, filed Jan. 15, 2016.

* cited by examiner

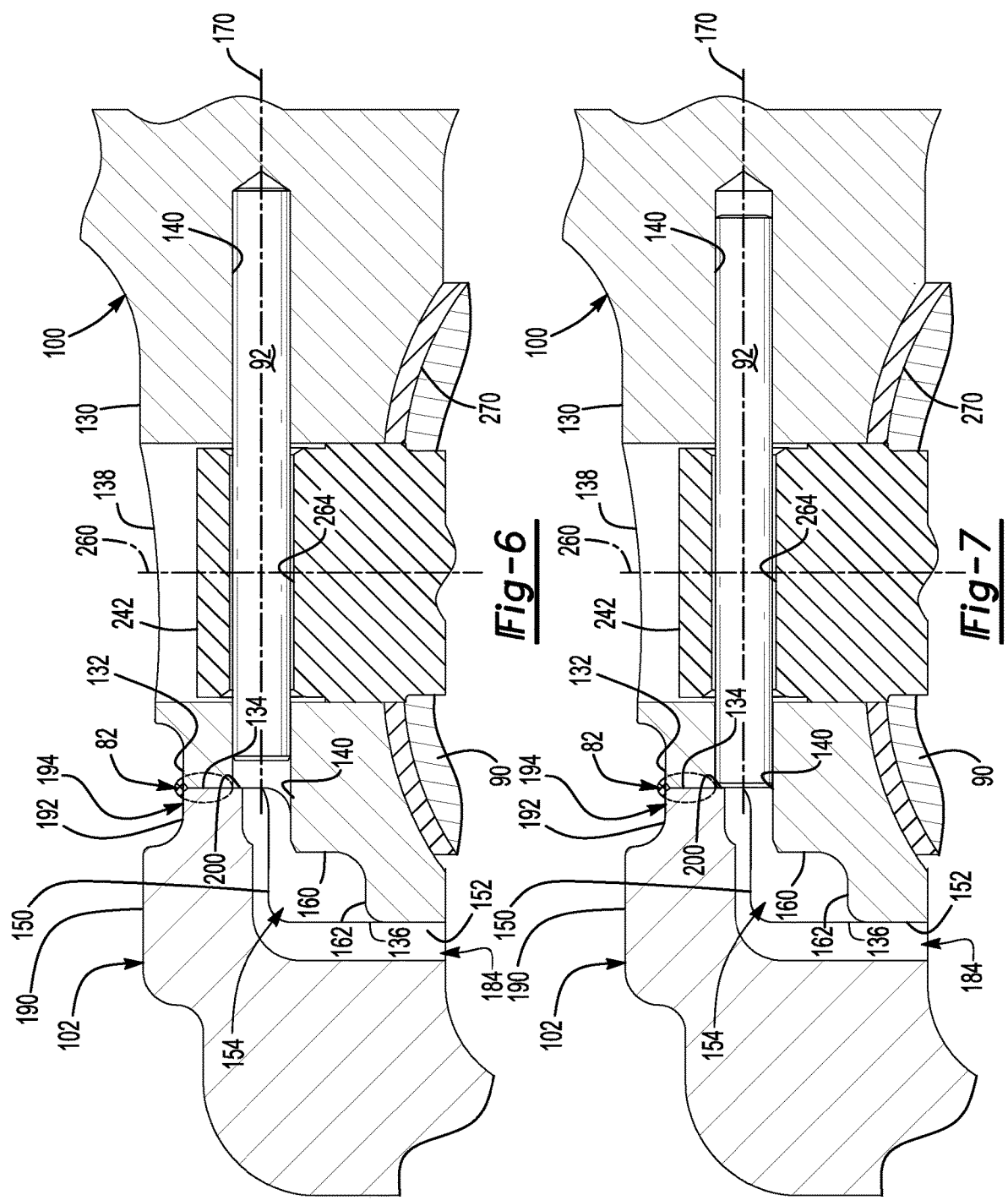

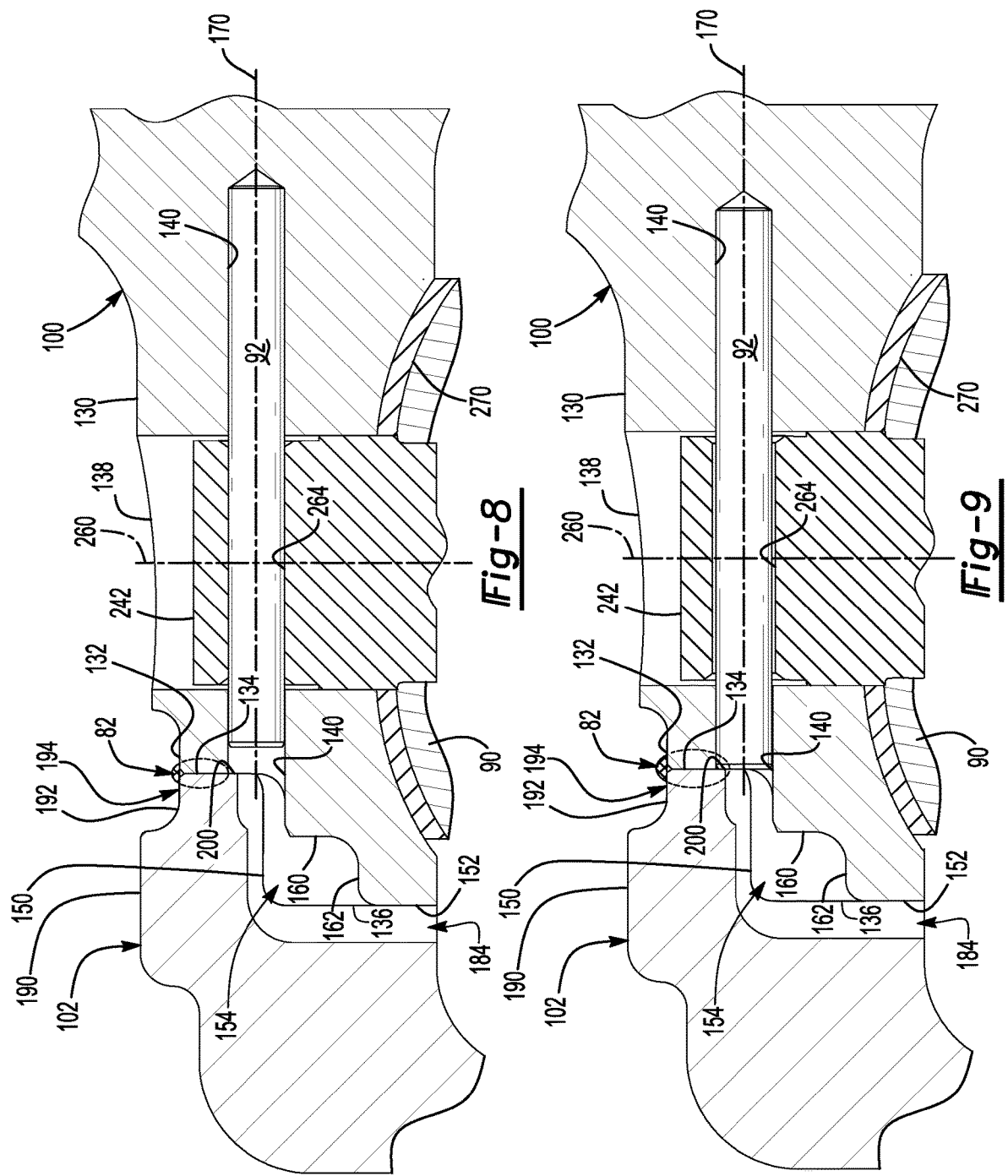

AXLE ASSEMBLY AND DIFFERENTIAL ASSEMBLY WITH SPIDER SHAFT RETENTION

TECHNICAL FIELD

This disclosure relates to an axle assembly that may include a differential assembly having a case that is configured to retain shafts of the spider.

BACKGROUND

A differential assembly having a case that is configured to retain shafts of a spider is disclosed in U.S. patent application Ser. No. 14/996,663.

SUMMARY

In at least one embodiment, a differential assembly is provided. The differential assembly may include a case, a spider, and a retainer pin. The case may be rotatable about an axis and may include a first case portion and a second case portion. The first case portion may have a spider receiving portion, an inner mounting ring, and a retainer pin hole. The spider receiving portion may have a spider shaft hole. The inner mounting ring may be disposed at an end of the first case portion. The retainer pin hole may extend through the inner mounting ring to the spider shaft hole. The second case portion may be disposed on the spider receiving portion. The second case portion may have an outer mounting ring that may extend around the inner mounting ring. The spider may have a secondary spider shaft that may be received in the spider shaft hole. The retainer pin may be disposed in the retainer pin hole and may couple the secondary spider shaft to the first case portion. The outer mounting ring may partially overlap the retainer pin hole to inhibit removal of the retainer pin from the retainer pin hole.

In at least one embodiment, a differential assembly is provided. The differential assembly may include a case, a spider, a retainer pin, and a weld. The case may have a first case portion and a second case portion. The first case portion may have a retainer pin hole and a first weld groove. The retainer pin hole may extend from a spider shaft hole to an inner mounting ring that may be disposed at an end of the first case portion. The first weld groove may extend around at least a portion of the retainer pin hole. The second case portion may have an outer mounting ring and a second weld groove. The outer mounting ring may extend around the inner mounting ring. The second weld groove may extend around at least a portion of the retainer pin hole. The spider may have a primary spider shaft and a secondary spider shaft. The primary spider shaft may be mounted to the first case portion. The secondary spider shaft may be received in the spider shaft hole and may extend from the spider shaft hole to the primary spider shaft. The retainer pin may be disposed in the retainer pin hole. The retainer pin may couple the secondary spider shaft to the first case portion. The outer mounting ring may inhibit removal of the retainer pin from the retainer pin hole. The weld may be provided in the first weld groove and the second weld groove to join the first case portion to the second case portion.

In at least one embodiment, an axle assembly is provided. The axle assembly may include a differential assembly that has a case, a spider, and a retainer pin. The case may be rotatable about an axis and may include a first case portion and a second case portion. The first case portion may have a first cavity, an exterior surface, a spider shaft hole, an inner mounting ring, and a retainer pin hole. The exterior surface may extend around the first cavity. The spider shaft hole may extend from the exterior surface to the first cavity. The retainer pin hole may extend from the inner mounting ring to the spider shaft hole. The second case portion may be mounted to the first case portion and may include an outer mounting ring. The outer mounting ring may extend around the inner mounting ring and may be partially received in the retainer pin hole. The spider may include a primary spider shaft and a secondary spider shaft. The primary spider shaft may be mounted to the first case portion. The secondary spider shaft may be received in the spider shaft hole and may extend between the spider shaft hole and the primary spider shaft. The primary and secondary spider shafts may not engage the second case portion. The retainer pin may couple the secondary spider shaft to the first case portion. The outer mounting ring may inhibit axial movement of the retainer pin.

BRIEF DESCRIPTION OF THE DRAWINGS

FIGS. 6-9 are magnified section views of a region of the differential assembly adjacent to a retainer pin.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
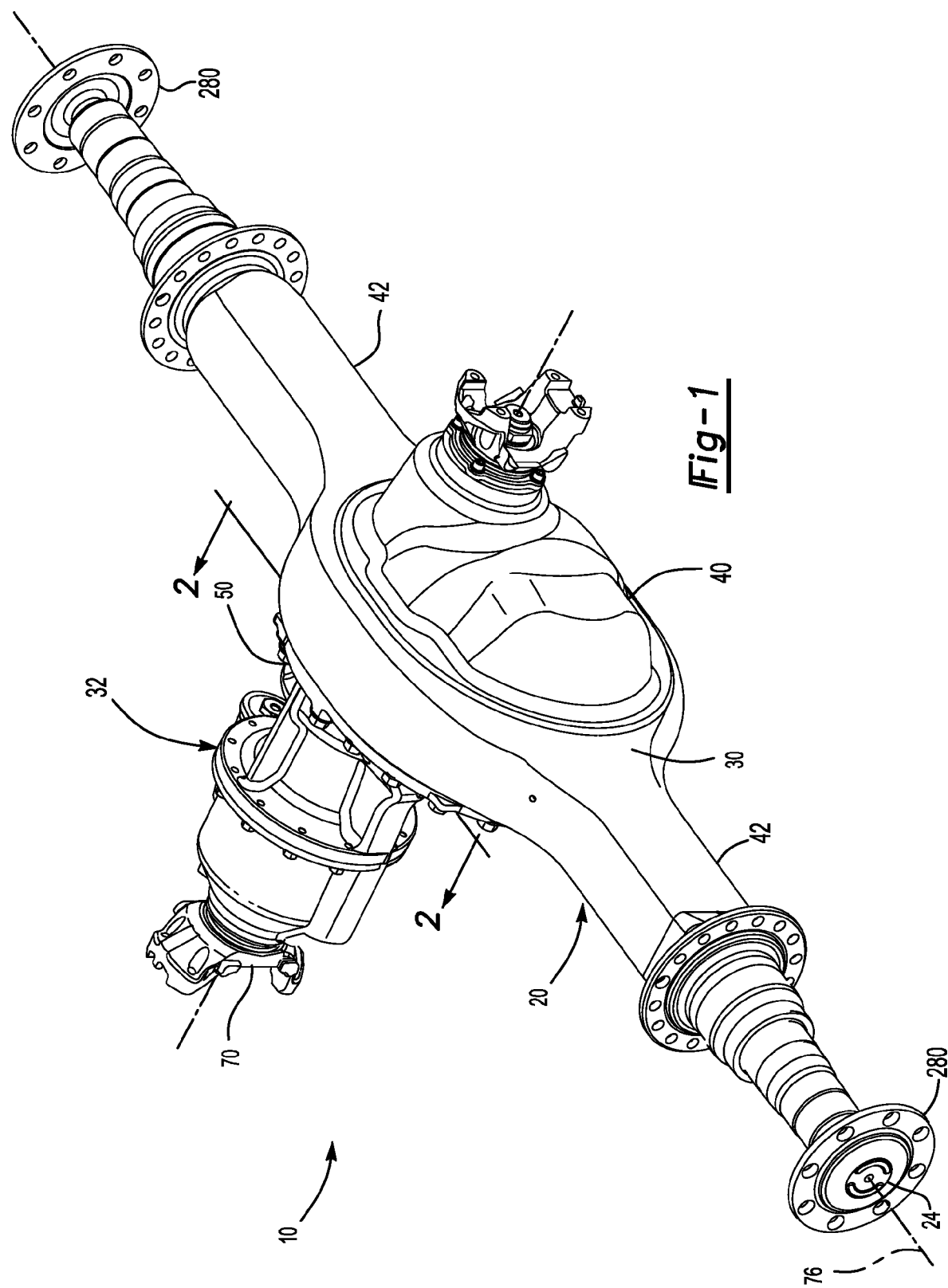
FIG. 1 is a perspective view of an axle assembly having a differential carrier that supports a differential assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIGS. 1 and 2, the axle assembly 10 may include a housing assembly 20, a differential assembly 22, and at least one axle shaft 24.

Referring to FIG. 1, the housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axle shafts 24. In at least one embodiment, the axle housing 30 may include a center portion 40 and at least one arm portion 42.

The center portion 40 may be disposed proximate the center of the axle housing 30. The center portion 40 may define a cavity that may receive the differential assembly 22. A lower region of the center portion 40 may at least partially define a sump portion that may contain lubricant. Splashed lubricant may flow down the sides of the center portion 40 and may flow over internal components of the axle assembly 10 and gather in the sump portion.

The center portion 40 may include a carrier mounting surface. The carrier mounting surface may face toward and may engage the differential carrier 32. The carrier mounting surface may facilitate mounting of the differential carrier 32 to the axle housing 30. For example, the carrier mounting surface may have a set of holes that may be aligned with corresponding holes on the differential carrier 32. Each hole may receive a fastener, such as a bolt, that may couple the differential carrier 32 to the axle housing 30.

One or more arm portions 42 may extend from the center portion 40. For example, two arm portions 42 may extend in opposite directions from the center portion 40 and away from the differential assembly 22. The arm portions 42 may have substantially similar configurations. For example, the arm portions 42 may each have a hollow configuration or tubular configuration that may extend around the corresponding axle shaft 24 and may help separate or isolate the axle shaft 24 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 24.

Figure 2:
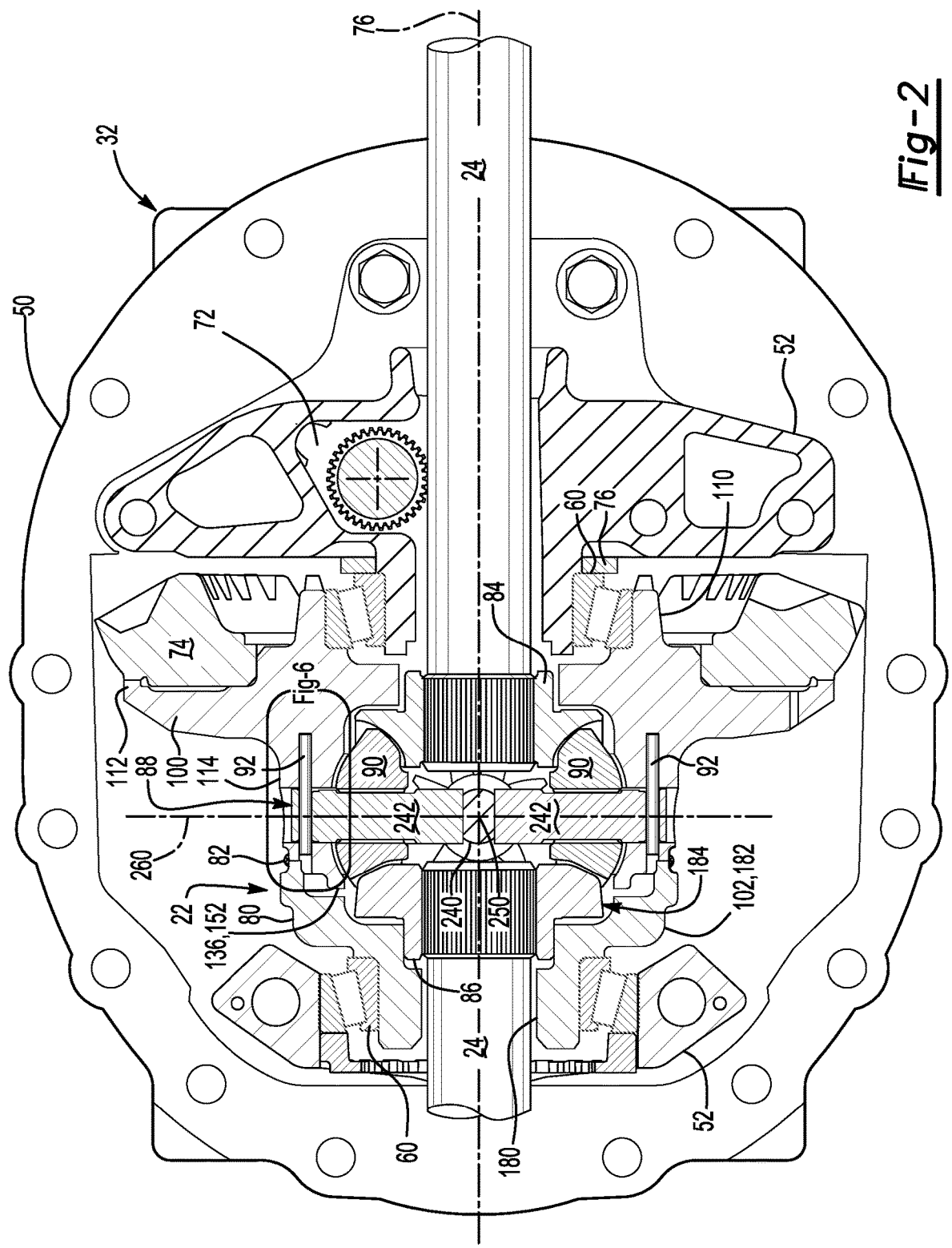
FIG. 2 is a section view of a portion of the differential carrier along section line 2-2.

Referring to FIGS. 1 and 2, the differential carrier 32, which may also be called a carrier housing, may be mounted to the center portion 40 of the axle housing 30. The differential carrier 32 may support components of the differential assembly 22. As is best shown in FIG. 2, the differential carrier 32 may have a flange portion 50 and one or more bearing supports 52.

Referring to FIGS. 1 and 2, the flange portion 50 may facilitate mounting of the differential carrier 32 to the axle housing 30. For example, the flange portion 50 may be disposed on the carrier mounting surface of the axle housing 30 and may have a set of holes that may receive fasteners as previously discussed.

Referring to FIG. 2, the bearing support 52 may receive a roller bearing assembly 60 that may rotatably support the differential assembly 22. In FIG. 2, two bearing supports 52 are shown that are configured to be received in the center portion 40 proximate opposite sides of the differential assembly 22. The bearing support 52 may be provided in various configurations. For example, a bearing support 52 may include a pair of legs that extend from the differential carrier 32, such as is shown on the left side of FIG. 2. A bearing cap may be mounted to the legs and may arch over a roller bearing assembly 60. In such a configuration, the bearing support 52 and bearing cap may cooperate to extend around, receive, and secure the roller bearing assembly 60. As another example such as is shown on the right side of FIG. 2, the bearing support 52 may be received in a roller bearing assembly 60 which in turn may support the differential assembly 22.

Referring to FIG. 2, the differential assembly 22 may be disposed in the center portion 40 of the housing assembly 20. The differential assembly 22 may transmit torque to the vehicle traction wheel assemblies and permit the traction wheel assemblies to rotate at different velocities. An input yoke 70 is shown in FIG. 1 to facilitate an abbreviated discussion of the operation of the axle assembly 10 and the differential assembly 22.

The input yoke 70 may be coupled to a vehicle drivetrain component, such as a drive shaft, that may be coupled to an output of a vehicle transmission or transfer case, which in turn may receive torque from a vehicle power source, such as an engine or motor. Alternatively, the input yoke 70 may be operatively connected to an output of another axle assembly. The input yoke 70 may be connected to or integrally formed with an input shaft that may be rotatably supported by one or more roller bearings that may be disposed on the differential carrier 32. The input shaft may be operatively connected to a drive pinion 72, the drive pinion 72 being best shown in FIG. 2, or may be integrally formed with the drive pinion 72. The drive pinion 72 may provide torque to a ring gear 74 that may be provided with the differential assembly 22. The ring gear 74 may rotate about an axis 76 and may splash lubricant that accumulates in the sump portion as it rotates. The ring gear 74 may be operatively connected to the axle shafts 24. As such, the differential assembly 22 may receive torque via the ring gear 74 and provide torque to the axle shafts 24.

Figure 3:
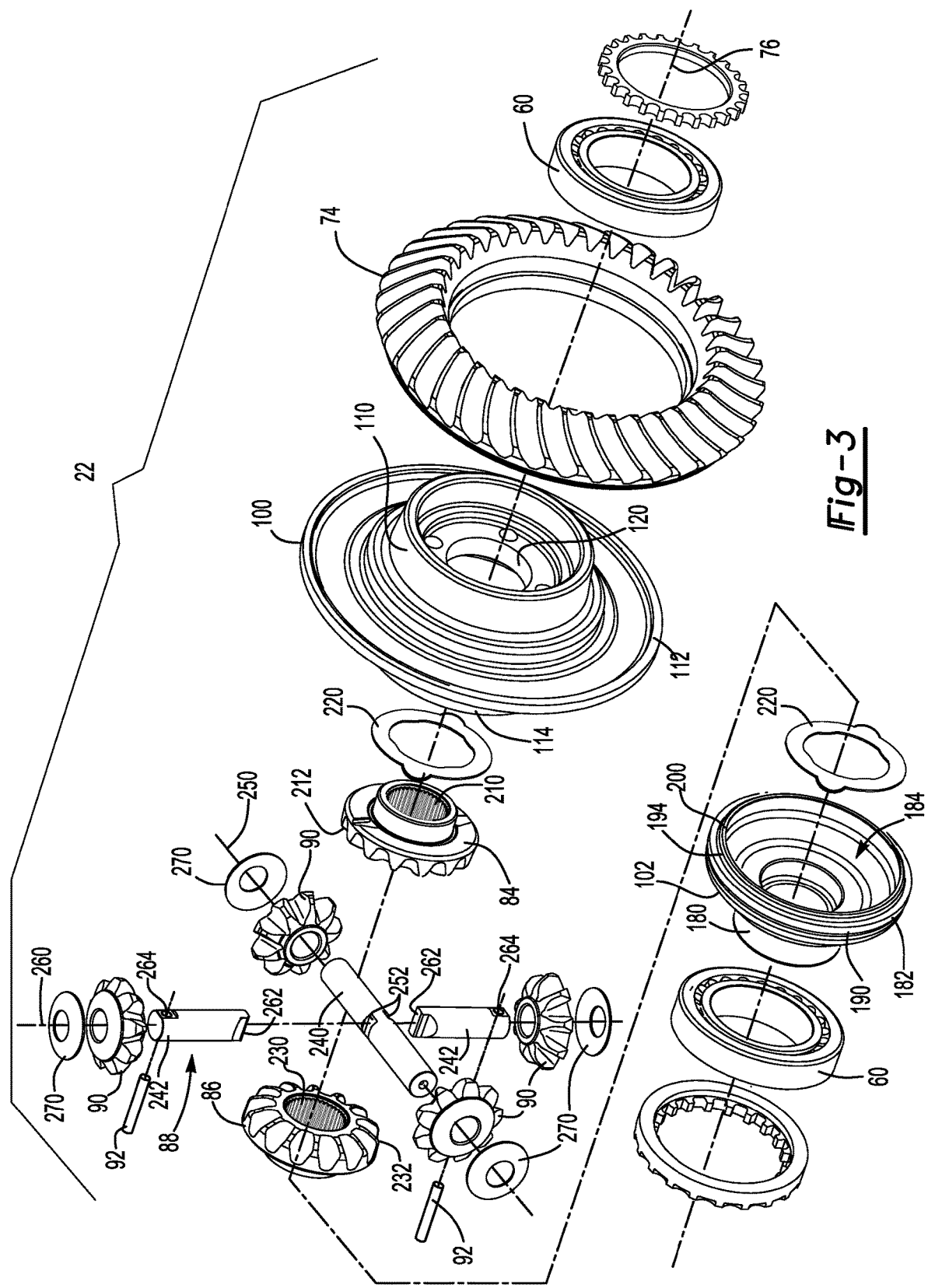
FIGS. 3 and 4 are exploded views of the differential assembly.
Figure 4:
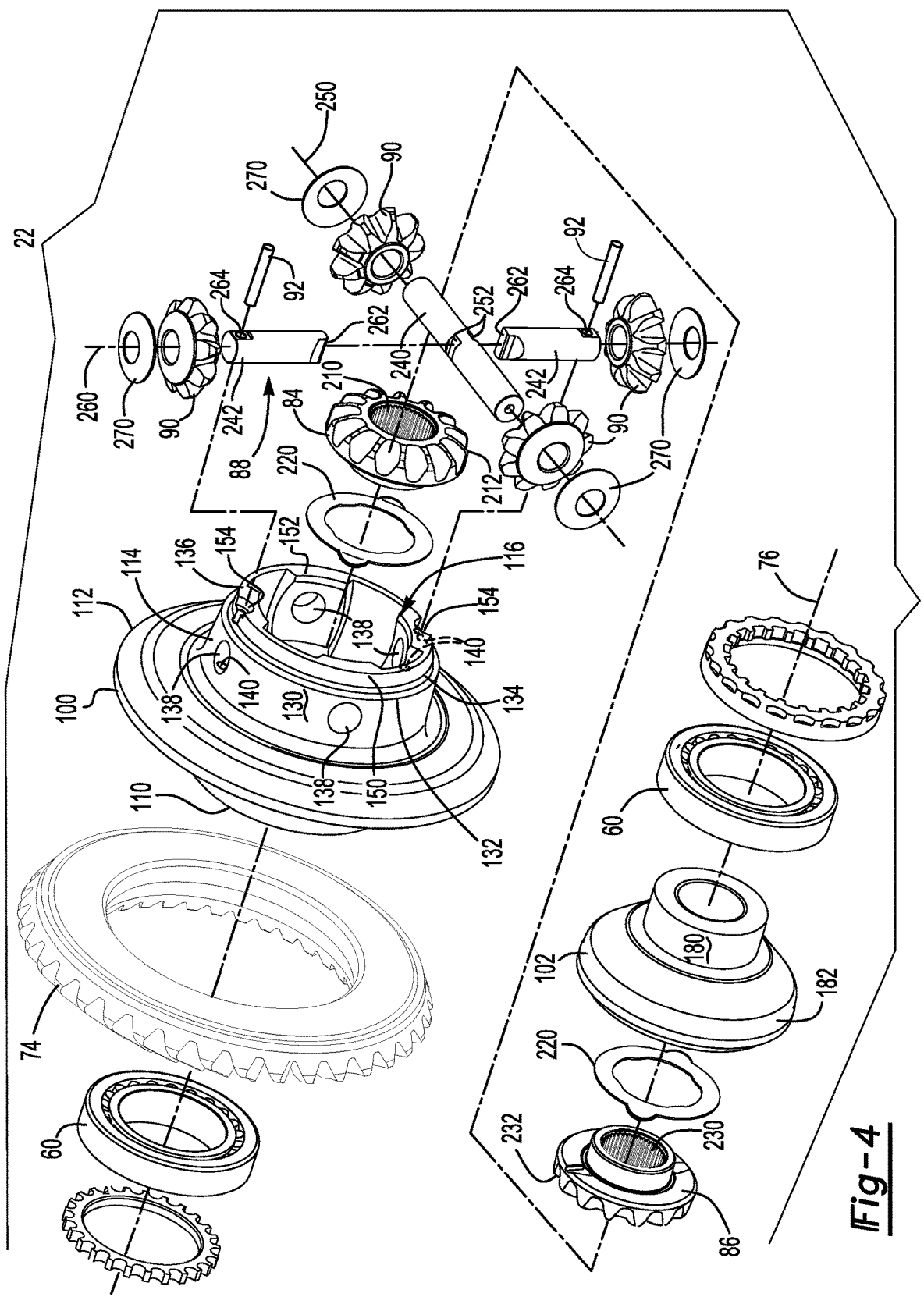

Referring to FIGS. 2-4, an example of a differential assembly 22 is shown in more detail. In addition to the ring gear 74, the differential assembly 22 may include a case 80, a weld 82, a first gear 84, a second gear 86, a spider 88, at least one pinion gear 90, and one or more retainer pins 92.

The case 80 may be configured to receive components of the differential assembly 22. In addition, the case 80 may be rotatable about the axis 76. In at least one embodiment, the case 80 may include a first case portion 100 and a second case portion 102 that may cooperate to at least partially define a cavity. The cavity may at least partially receive the first gear 84, second gear 86, spider 88, and pinion gear(s) 90.

Referring to FIGS. 2-5, an example of a first case portion 100 is shown. As is best shown beginning with FIGS. 2-4, the first case portion 100 may include a first bearing portion 110, a mounting flange 112, a spider receiving portion 114, and a first cavity 116.

Referring to FIGS. 2 and 3, the first bearing portion 110 may extend around the axis 76 and may extend around and may at least partially define a first hole 120. As is best shown in FIG. 2, the first bearing portion 110 may be disposed proximate and may engage a roller bearing assembly 60 that may rotatably support the first case portion 100.

Referring to FIGS. 2 and 4, the mounting flange 112 may be disposed between the first bearing portion 110 and the spider receiving portion 114. For example, the mounting flange 112 may extend from the first bearing portion 110 to the spider receiving portion 114. The mounting flange 112 may extend away from the axis 76 and may extend further away from the axis 76 than the first bearing portion 110 and the spider receiving portion 114. The ring gear 74 may be disposed on the mounting flange 112 and may be oriented such that the teeth of the ring gear 74 extend away from the second case portion 102. The ring gear 74 may be attached to the mounting flange 112 in any suitable manner. For instance, the ring gear 74 may be welded to the mounting flange 112 or may be attached to the mounting flange 112 with one or more fasteners, such as bolts.

Referring to FIGS. 2 and 3, the spider receiving portion 114 may extend from the mounting flange 112 toward the second case portion 102. As is best shown in FIG. 3, the spider receiving portion 114 may extend around and may at least partially define the first cavity 116. In at least one embodiment, the spider receiving portion 114 may have a first exterior surface 130, a first weld groove 132, an intermediate end surface 134, an inner mounting ring 136, at least one spider shaft hole 138, and at least one retainer pin hole 140.

Figure 5:
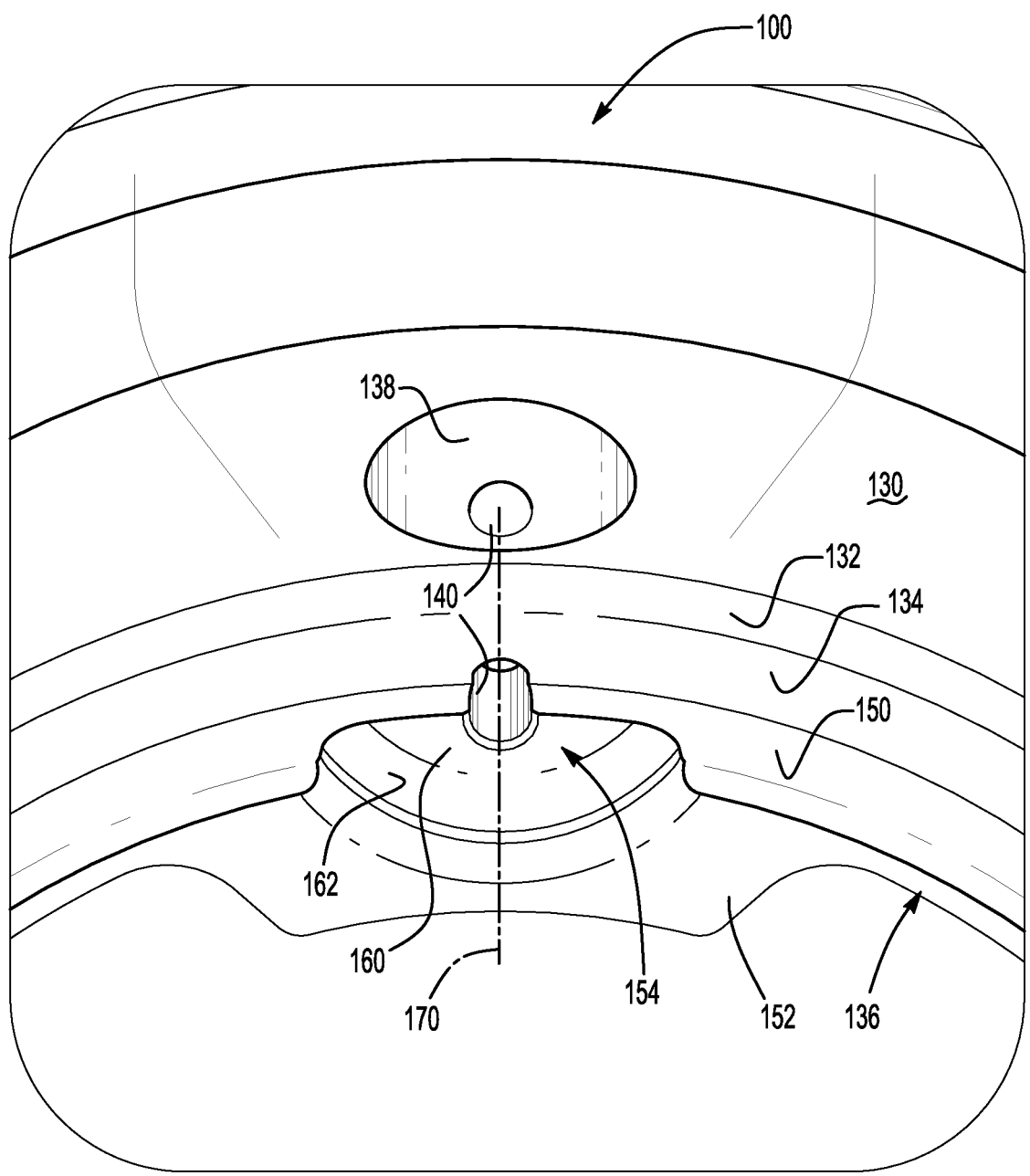
FIG. 5 is a magnified view of a first case portion of the differential assembly.

Referring to FIGS. 4 and 5, the first exterior surface 130 may be an exterior circumferential surface of the spider receiving portion 114. As such, the first exterior surface 130 may face away from the first cavity 116. The first exterior surface 130 may extend around the axis 76 and around at least a portion of the first cavity 116.

The first weld groove 132 may extend from the first exterior surface 130. For example, the first weld groove 132 may extend from the first exterior surface 130 in a direction that extends toward the second case portion 102. In addition, the first weld groove 132 may extend toward the axis 76 and may be disposed closer to the axis 76 than the first exterior surface 130. As is best shown in FIG. 6, the first weld groove 132 may extend around at least a portion of the retainer pin hole 140. The first weld groove 132 may be axially positioned or positioned in a direction that extends along the axis 76 between the spider shaft hole 138 and the second case portion 102.

The intermediate end surface 134 may extend from an end of the first weld groove 132 toward the axis 76. In addition, the intermediate end surface 134 may extend to the inner mounting ring 136. The intermediate end surface 134 may be disposed substantially perpendicular to the axis 76 and one or more embodiments. As is best shown in FIG. 5, the intermediate end surface 134 may extend to and may intersect one or more of the retainer pin holes 140.

Referring to FIGS. 4 and 5, the inner mounting ring 136 may be disposed at an end of the first case portion 100. As is best shown in FIG. 2, the inner mounting ring 136 may be disposed inside the second case portion 102. In at least one embodiment, such as is shown in FIGS. 4 and 5, the inner mounting ring 136 may have an outer surface 150, an inner mounting ring end surface 152, and one or more recesses 154.

The outer surface 150 may face away from the axis 76 and may face toward an outer mounting ring of the second case portion 102. The outer surface 150 may be a circumferential surface that may extend around the axis 76 and around at least a portion of the first cavity 116. As such, at least a portion of the outer surface 150 may extend substantially parallel to the axis 76. The outer surface 150 may extend between the intermediate end surface 134 and the inner mounting ring end surface 152. In addition, the outer surface 150 may intersect one or more retainer pin holes 140.

Referring to FIGS. 2 and 5, the inner mounting ring end surface 152 may be disposed at an end of the first case portion 100 that may be disposed opposite the first bearing portion 110. For example, the inner mounting ring end surface 152 may be disposed at an end of the inner mounting ring 136 and may face toward the second case portion 102. As is best shown in FIG. 6, the inner mounting ring end surface 152 may be disposed inside the second case portion 102 and may be spaced apart from and may not engage the second case portion 102. The inner mounting ring end surface 152 may extend around the axis 76 and may extend from the first cavity 116 to the outer surface 150. As such, the inner mounting ring end surface 152 may be disposed substantially perpendicular to the axis 76 and may extend from the outer surface 150 toward the axis 76.

Referring to FIGS. 4 and 5, one or more recesses 154 may be provided with the inner mounting ring 136. In FIG. 4, two recesses 154 are shown; however, it is contemplated that a greater or lesser number of recesses 154 may be provided. Each recess 154 may be disposed adjacent to a corresponding retainer pin hole 140 and may extend at least partially around the retainer pin hole 140. Each recess 154 may be at least partially defined by recess bottom surface 160 and a recess step surface 162.

The recess bottom surface 160 may intersect at an end of a corresponding retainer pin hole 140. The recess bottom surface 160 may be axially positioned between the intermediate end surface 134 and the inner mounting ring end surface 152. In addition, the recess bottom surface 160 may extend from the outer surface 150 and from the retainer pin hole 140 toward the axis 76 and to the recess step surface 162.

The recess step surface 162 may be spaced apart from the retainer pin hole 140. The recess step surface 162 may extend axially from the inner mounting ring end surface 152 to the recess bottom surface 160. As is best shown in FIG. 5, opposite ends of the recess step surface 162 may intersect the outer surface 150 and the recess step surface 162 may extend along an arc or curve. For example, the recess step surface 162 may extend along an arc or curve that may extend away from the outer surface 150 and toward the axis 76. As such, the recess step surface 162 may be spaced apart from and may not engage the second case portion 102.

Referring to FIG. 4, one or more spider shaft holes 138 may be provided in the spider receiving portion 114. A spider shaft hole 138 may receive a shaft of the spider 88 as will be discussed in more detail below. In FIG. 4, four spider shaft holes 138 are shown; however, it is contemplated that a greater or lesser number of spider shaft holes 138 may be provided. The spider shaft holes 138 may be spaced apart from each other and may be arranged around the axis 76. For example, spider shaft holes 138 may be disposed along axes that may be disposed substantially perpendicular to the axis 76. The spider shaft holes 138 may be through holes that may be completely defined in the first case portion 100. For example, spider shaft holes 138 may extend from the first cavity 116 to the first exterior surface 130. In addition, the spider shaft holes 138 may be axially positioned between the mounting flange 112 and the first weld groove 132.

One or more retainer pin holes 140 may be provided with the first case portion 100. A retainer pin hole 140 may receive a retainer pin 92 that may couple or secure the spider 88 to the first case portion 100 as will be discussed in more detail below. In FIG. 4, two retainer pin holes 140 are shown that are disposed directly opposite each other; however, it is contemplated that a greater or lesser number of retainer pin holes 140 may be provided and that each retainer pin hole 140 need not be disposed directly opposite another retainer pin hole 140. A retainer pin hole 140 may extend through the inner mounting ring 136 to a spider shaft hole 138. More specifically, a retainer pin hole 140 may extend from the recess bottom surface 160 to at least the spider shaft hole 138 as is best shown in FIG. 6. In addition, a portion of the retainer pin hole 140 may extend in an axial direction from the spider shaft hole 138 toward the first bearing portion 110 and the mounting flange 112, thereby permitting the retainer pin 92 to be inserted completely through a shaft of the spider 88 as will be discussed in more detail below.

Referring to FIG. 6, each retainer pin hole 140 may extend along a corresponding retainer pin hole axis 170. The retainer pin hole axis 170 may be disposed substantially parallel to the axis 76 and may intersect the second case portion 102. In addition, the retainer pin hole axis 170 may be disposed closer to the axis 76 than the outer surface 150 or where the outer surface 150 intersects the retainer pin hole 140.

Referring to FIGS. 2-4, the second case portion 102 may be mounted on the first case portion 100. The second case portion 102 may be fixedly disposed on the spider receiving portion 114 of the first case portion 100 such that the second case portion 102 does not rotate with respect to the first case portion 100. For instance, the second case portion 102 may be assembled to the first case portion 100 with the weld 82, which is best shown in FIG. 6, or alternatively with one or more fasteners that may extend through holes in the second case portion 102. In at least one embodiment, the second case portion 102 may include a second bearing portion 180, a second mounting portion 182, and a second cavity 184.

Referring to FIG. 3, the second bearing portion 180 may extend around the axis 76 and may extend around the second cavity 184. As is best shown in FIG. 2, a roller bearing assembly 60 that rotatably supports the second case portion 102 may be disposed on the second bearing portion 180.

The second mounting portion 182 may extend from the second bearing portion 180 toward the first case portion 100. The second mounting portion 182 may also extend outwardly from the second bearing portion 180 and away from the axis 76. Moreover, the second case portion 102 and the second mounting portion 182 may extend away from the axis 76 by a sufficient distance to cover the retainer pin holes 140. As is best shown in FIG. 3, the second mounting portion 182 may extend around and may at least partially define the second cavity 184. The second mounting portion 182 may include a second exterior surface 190, a second weld groove 192, and an outer mounting ring 194.

Referring to FIGS. 3 and 6, the second exterior surface 190 may be an exterior circumferential surface of the second mounting portion 182. As such, the second exterior surface 190 may face away from the second cavity 184. The second exterior surface 190 may extend around the axis 76 and around at least a portion of the second cavity 184.

The second weld groove 192 may extend from the second exterior surface 190. For example, the second weld groove 192 may extend from the second exterior surface 190 in a direction that extends toward the first case portion 100 and to the first weld groove 132. In addition, the second weld groove 192 may extend toward the axis 76 and may be disposed closer to the axis 76 than the second exterior surface 190. As is best shown in FIG. 6, the second weld groove 192 may extend around at least a portion of the retainer pin hole 140. The second weld groove 192 may be provided on or may at least partially define the outer mounting ring 194. Moreover, the first weld groove 132 and the second weld groove 192 may be axially positioned between the spider shaft hole 138 and the inner mounting ring end surface 152.

The outer mounting ring 194 may extend around the inner mounting ring 136. For example, the outer mounting ring 194 may extend around and may engage the outer surface 150 of the inner mounting ring 136. In at least one embodiment, the outer mounting ring 194 may have an outer mounting ring end surface 200.

Referring to FIGS. 3 and 6, the outer mounting ring end surface 200 may be disposed at an end of the second case portion 102 that may be disposed opposite the second bearing portion 180. For example, the outer mounting ring end surface 200 may be disposed at an end of the outer mounting ring 194 and may face toward and may engage the intermediate end surface 134 of the first case portion 100. The outer mounting ring end surface 200 may extend around the axis 76. For example, the outer mounting ring end surface 200 may be disposed substantially perpendicular to the axis 76 in one or more embodiments. The outer mounting ring end surface 200 may extend from the second cavity 184 to the second weld groove 192. As is best shown in FIG. 6, the outer mounting ring end surface 200 may partially overlap a retainer pin hole 140 or may be partially received in a retainer pin hole 140 to inhibit removal of the retainer pin 92 from the retainer pin hole 140. As such, the outer mounting ring end surface 200 may engage an end of a retainer pin 92 to limit or inhibit axial movement of the retainer pin 92.

Referring to FIG. 2, the second cavity 184 may be disposed inside the second case portion 102. The second cavity 184 may at least partially receive the second gear 86 and an axle shaft 24. The second cavity 184 may extend from an end of the second mounting portion 182 through the second case portion 102.

Referring to FIGS. 2 and 6, the weld 82 may join the first case portion 100 to the second case portion 102. The weld 82 may be provided in the first weld groove 132 and the second weld groove 192 and may extend continuously around the axis 76. As is best shown in FIGS. 6-8, the weld 82 may extend to the retainer pin hole 140 but may not extend to the retainer pin 92. In these figures, the retainer pin hole 140 may have a length that is greater than the length of a retainer pin 92 to allow the retainer pin 92 to be inserted to a sufficient depth that is clear of or spaced apart from the weld 82. As shown in FIG. 9, the weld 82 may alternatively extend to the retainer pin 92 and may join the retainer pin 92 to the case 80, thereby inhibiting movement of the retainer pin 92. In FIG. 9, the retainer pin hole 140 is shown with a shorter axial length than in FIGS. 6-8, which may help position the retainer pin 92 closer to the outer mounting ring end surface 200 and the weld 82.

Referring to FIGS. 2 and 3, the first gear 84 may be disposed in the first case portion 100. For example, the first gear 84 may be at least partially disposed in the first hole 120 and may be configured to rotate about the axis 76. As is best shown in FIG. 4, the first gear 84 may include a first gear hole 210 and a gear portion 212.

The first gear hole 210 may be disposed along the axis 76. The first gear hole 210 may be configured to receive the first axle shaft 24. In addition, the first gear 84 may rotate with the first axle shaft 24. For example, the first gear hole 210 may have a spline that may mate with a corresponding spline on the first axle shaft 24 such that the first gear 84 may not rotate with respect to the first axle shaft 24.

The gear portion 212 may face toward and may be spaced apart from the spider 88. The gear portion 212 may have a set of teeth that may be arranged around the axis 76 and that may mate with teeth on one or more pinion gears 90. A thrust washer 220 or bearing may be disposed between the gear portion 212 and the first case portion 100.

Referring to FIG. 3, the second gear 86 may be disposed in the first case portion 100 and the second case portion 102. For example, the second gear 86 may be at least partially disposed in the second cavity 184 and the second cavity 184 and may be configured to rotate about the axis 76. The second gear 86 may be spaced apart from the first gear 84 and may have a similar or identical configuration as the first gear 84. In at least one embodiment, the second gear 86 may include a second gear hole 230 and a gear portion 232.

The second gear hole 230 may be disposed along the axis 76. The second gear hole 230 may be configured to receive the second axle shaft 24. In at least one embodiment, the second gear 86 may rotate with the second axle shaft 24. For example, the second gear hole 230 may have a spline that may mate with a corresponding spline on the second axle shaft 24 such that the second gear 86 may not rotate with respect to the second axle shaft 24.

The gear portion 232 may face toward and may be spaced apart from the spider 88. The gear portion 232 may have a set of teeth that may be arranged around the axis 76 and that may mate with teeth on one or more pinion gears 90. A thrust washer 220 or bearing may be disposed between the gear portion 232 and the second case portion 102.

Referring to FIGS. 2-4, the spider 88 may rotate about the axis 76 with the case 80. In at least one embodiment, the spider 88 may include a primary spider shaft 240 and at least one secondary spider shaft 242.

The primary spider shaft 240 may be mounted to the first case portion 100. For example, the primary spider shaft 240 may have opposing ends that may be received in corresponding spider shaft holes 138 of the first case portion 100. As such, the primary spider shaft 240 may extend across the first cavity 116 and may extend through the axis 76. In addition, the primary spider shaft 240 may be spaced apart from and may not engage the second case portion 102. The primary spider shaft 240 may be disposed along a primary spider shaft axis 250. The primary spider shaft axis 250 may intersect and may be disposed substantially perpendicular to the axis 76. As is best shown in FIGS. 3 and 4, the primary spider shaft 240 may have a generally cylindrical configuration and may include one or more notches 252.

One or more notches 252 may be disposed proximate the center of the primary spider shaft 240. In the configuration shown, two notches 252 are provided that are disposed opposite each other and extend inwardly toward the axis 76. A notch 252 may receive and facilitate positioning of a secondary spider shaft 242 with respect to the primary spider shaft 240.

Referring to FIGS. 2-4, one or more secondary spider shafts 242 may be mounted to the first case portion 100. The secondary spider shaft 242 may extend from a spider shaft hole 138 to the primary spider shaft 240. For example, the secondary spider shaft 242 may have a first end that may be received in the notch 252 of the primary spider shaft 240 and a second end that may be disposed opposite the first end and may be received in a corresponding spider shaft hole 138. In addition, the secondary spider shaft 242 may be spaced apart from and may not engage the second case portion 102.

The secondary spider shaft 242 may be disposed along a secondary spider shaft axis 260. The secondary spider shaft axis 260 may intersect and may be disposed substantially perpendicular to the axis 76 and the primary spider shaft axis 250. In addition, the primary spider shaft axis 250 and secondary spider shaft axis 260 may be substantially coplanar or disposed in a common plane. In the configuration shown, two secondary spider shafts 242 are provided that are disposed on opposite sides of the primary spider shaft 240 and are coaxially disposed along the secondary spider shaft axis 260. The secondary spider shafts 242 may have common or substantially identical configurations that may include a tapered end 262 and a retainer pin receiving hole 264.

The tapered end 262 may be disposed proximate the primary spider shaft 240. For example the tapered end 262 may be received in a notch 252 of the primary spider shaft 240. The secondary spider shaft 242 and its tapered end 262 may not be fixedly attached to the primary spider shaft 240 in one or more embodiments.

Referring to FIGS. 3, 4 and 6, the secondary spider shaft 242 may have a retainer pin receiving hole 264 that may receive the retainer pin 92. The retainer pin receiving hole 264 may be disposed near the second end of the secondary spider shaft 242 and may be aligned with a corresponding retainer pin hole 140 in the first case portion 100. It is also contemplated that one or more retainer pin receiving holes 264 may be provided with the primary spider shaft 240 in one or more embodiments.

Referring to FIGS. 3, 4 and 6, a pinion gear 90 may be rotatably disposed on the primary spider shaft 240 and the secondary spider shafts 242. For instance, two pinion gears 90 may be disposed on the primary spider shaft 240 while a single pinion gear 90 may be disposed on each secondary spider shaft 242. Each pinion gear 90 may be disposed in the cavity of the case 80 and may be rotatably supported or retained on a corresponding spider shaft with one or more fasteners 270, such as a washer and/or a thrust bearing. The fastener 270 may engage an inner wall of the first case portion 100. The pinion gears 90 on the primary spider shaft 240 may rotate about the primary spider shaft axis 250. The pinion gear 90 on the secondary spider shaft 242 may rotate about the secondary spider shaft axis 260. Each pinion gear 90 may include a set of teeth that mate with teeth on the first gear 84 and teeth on the second gear 86.

Referring to FIGS. 2 and 4, one or more retainer pins 92 may be provided to secure or couple the primary spider shaft 240 and/or the secondary spider shaft 242 to the first case portion 100. A retainer pin 92 may be received in a retainer pin hole 140 and may extend through a corresponding retainer pin receiving hole 264 in a spider shaft, such as a secondary spider shaft 242. The retainer pin 92 may couple a spider shaft to the first case portion 100 to inhibit radial movement of a spider shaft or movement of the spider shaft toward or away from the axis 76. Moreover, the retainer pin 92 may provide a double shear joint by inserting the retainer pin 92 completely through the retainer pin hole 140 such that the retainer pin 92 extends into portions of the retainer pin hole 140 that are located on opposite sides of the spider shaft. The retainer pin 92 may have any suitable configuration. For example, the retainer pin 92 may be configured as a hollow or solid cylindrical rod or as a roll pin or spiral pin.

Referring to FIGS. 6-8, the retainer pin 92 may be received in the retainer pin hole 140 and the retainer pin receiving hole 264 in various ways.

In FIGS. 6 and 7, the retainer pin 92 is received in the retainer pin hole 140 and the retainer pin receiving hole 264 with a clearance fit. As such, the retainer pin 92 may be free to move axially or along the retainer pin hole axis 170. In FIG. 6, the retainer pin 92 is fully inserted in the retainer pin hole 140 and is spaced apart from the second case portion 102 and the outer mounting ring end surface 200 of the outer mounting ring 194.

In FIG. 7, the retainer pin 92 is moved to the left as compared to FIG. 6. In FIG. 7, an end of the retainer pin 92 engages the outer mounting ring end surface 200 of the second case portion 102, which is shown overlapping or extending into the retainer pin hole 140. As such, the outer mounting ring 194 inhibits or limits axial movement of the retainer pin 92 and prevents the retainer pin 92 from exiting the retainer pin hole 140, which in turn helps retain a corresponding spider shaft to the case 80.

In FIG. 8, the retainer pin 92 is received in the retainer pin hole 140 and the retainer pin receiving hole 264 with an interference fit. An interference fit may further aid in inhibiting axial movement of the retainer pin 92. It is contemplated that an interference fit may be provided between the retainer pin 92 and the retainer pin hole 140 or a portion thereof, between the retainer pin 92 and the retainer pin receiving hole 264, or combinations thereof. The configuration shown in FIG. 9 with a shorter retainer pin hole 140 may be provided with an interference fit or a clearance fit.

Referring to FIGS. 1 and 2, the axle shafts 24 may transmit torque from the differential assembly 22 to corresponding traction wheel assemblies. In FIG. 2, two axle shafts 24 are provided such that each axle shaft 24 extends through a different arm portion 42 of axle housing 30. The axle shafts 24 may extend along and may be rotated about the axis 76 by the differential assembly 22. Each axle shaft 24 may have a first end and a second end. The first end may be coupled to the differential assembly 22. The second end may be disposed opposite the first end and may be operatively connected to a wheel end assembly that may have a wheel hub that may support a wheel. As shown in FIG. 1, an axle flange 280 may be disposed proximate the second end of the axle shaft 24 and may facilitate coupling of the axle shaft 24 to the wheel hub.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A differential assembly comprising:
a case that is rotatable about an axis and includes:
a first case portion that has a spider receiving portion having a spider shaft hole, an inner mounting ring that is disposed at an end of the first case portion, a retainer pin hole that extends through the inner mounting ring to the spider shaft hole, and a mounting flange that extends away from the axis and extends from the spider receiving portion; and
a second case portion that is disposed on the spider receiving portion and that has an outer mounting ring that extends around the inner mounting ring such that the inner mounting ring is received inside and is spaced apart from the outer mounting ring;
a ring gear that is disposed on the mounting flange, wherein the spider shaft hole is axially positioned between the mounting flange and the second case portion;
a spider that has a secondary spider shaft that is received in the spider shaft hole; and
a retainer pin disposed in the retainer pin hole that couples the secondary spider shaft to the first case portion, wherein the outer mounting ring partially overlaps the retainer pin hole to inhibit removal of the retainer pin from the retainer pin hole.

2. The differential assembly of claim 1 wherein the spider further comprises a primary spider shaft that is mounted to the first case portion and the secondary spider shaft extends between the spider shaft hole and the primary spider shaft.

3. The differential assembly of claim 2 wherein the primary spider shaft and the secondary spider shaft do not engage the second case portion.

4. The differential assembly of claim 1 wherein the inner mounting ring has an outer surface that faces toward the outer mounting ring, wherein the outer surface intersects the retainer pin hole.

5. The differential assembly of claim 4 wherein the retainer pin hole extends along a retainer pin hole axis that is disposed closer to the axis than where the outer surface intersects the retainer pin hole.

6. The differential assembly of claim 1 wherein the second case portion does not engage the spider and the outer mounting ring engages the inner mounting ring and the retainer pin.

7. The differential assembly of claim 1 wherein the inner mounting ring has a recess that is disposed adjacent to an end of the retainer pin hole.

8. The differential assembly of claim 1 wherein the retainer pin hole extends in an axial direction from the spider shaft hole toward the mounting flange.

9. A differential assembly comprising:
a case that includes:
a first case portion that has a retainer pin hole that extends from a spider shaft hole to an inner mounting ring that is disposed at an end of the first case portion, a first weld groove that extends around at least a portion of the retainer pin hole, and an intermediate end surface that extends from the first weld groove; and
a second case portion that has an outer mounting ring that extends around the inner mounting ring such that the inner mounting ring is received inside and is spaced apart from the outer mounting ring and a second weld groove that extends around at least a portion of the retainer pin hole;
a spider that includes:
a primary spider shaft that is mounted to the first case portion; and
a secondary spider shaft that is received in the spider shaft hole and that extends from the spider shaft hole to the primary spider shaft;
a retainer pin disposed in the retainer pin hole that couples the secondary spider shaft to the first case portion, wherein the outer mounting ring has an outer mounting ring end surface that contacts the intermediate end surface and contacts an end of the retainer pin to inhibit removal of the retainer pin from the retainer pin hole; and
a weld that is provided in the first weld groove and the second weld groove that joins the first case portion to the second case portion.

10. The differential assembly of claim 9 wherein the case is rotatable about an axis and the weld extends continuously around the axis.

11. The differential assembly of claim 9 wherein the weld extends to the retainer pin and joins the retainer pin to the case.

12. The differential assembly of claim 9 wherein the second weld groove is provided on the outer mounting ring and extends from the first weld groove.

13. The differential assembly of claim 9 wherein the case is rotatable about an axis and the inner mounting ring includes an outer surface that faces away from the axis and an inner mounting ring end surface that extends from the outer surface toward the axis, wherein the first weld groove and the second weld groove are axially positioned between the spider shaft hole and the inner mounting ring end surface.

14. The differential assembly of claim 13 wherein the outer surface intersects the retainer pin hole.

15. An axle assembly comprising:
a differential assembly that includes:
a case that is rotatable about an axis and that includes:
a first case portion that has a first cavity, a first exterior surface disposed around the first cavity, a spider shaft hole that extends from the first exterior surface to the first cavity, an inner mounting ring, and a retainer pin hole that extends from the inner mounting ring to the spider shaft hole, wherein the inner mounting ring has an outer surface that faces away from the axis and that intersects the retainer pin hole; and
a second case portion that is mounted to the first case portion, the second case portion including an outer mounting ring that extends around the inner mounting ring such that the inner mounting ring is received inside and is spaced apart from the outer mounting ring and is partially received in the retainer pin hole;
a spider that includes:
a primary spider shaft that is mounted to the first case portion and does not engage the second case portion; and
a secondary spider shaft that is received in the spider shaft hole and that extends between the spider shaft hole and the primary spider shaft, wherein the secondary spider shaft does not engage the second case portion; and
a retainer pin that couples the secondary spider shaft to the first case portion, wherein the outer mounting ring inhibits axial movement of the retainer pin.

16. The axle assembly of claim 15 wherein a ring gear is mounted on a mounting flange of the first case portion.

17. The axle assembly of claim 15 wherein the inner mounting ring has an inner mounting ring end surface that extends from the outer surface toward the axis.

18. The axle assembly of claim 17 wherein the first case portion has a first weld groove that is recessed from the outer surface and an intermediate end surface that extends from the first weld groove to the inner mounting ring, wherein the intermediate end surface intersects the retainer pin hole and engages the outer mounting ring of the second case portion.

19. The axle assembly of claim 18 wherein the inner mounting ring has a recess that is disposed adjacent to an end of the retainer pin hole, wherein the recess is at least partially defined by a recess bottom surface that extends from the retainer pin hole toward the axis and a recess step surface that extends from the recess bottom surface to the inner mounting ring end surface.

20. The axle assembly of claim 19 wherein the recess step surface extends along an arc that extends away from the outer mounting ring.

\* \* \* \* \*